United States Patent
Cheng

(10) Patent No.: US 9,034,174 B2
(45) Date of Patent: May 19, 2015

(54) IRON OXIDE MAGNETIC NANOPARTICLE, ITS PREPARATION AND ITS USE IN DESULFURIZATION

(71) Applicant: NANOPETRO COMPANY LIMITED, New Territories (HK)

(72) Inventor: Man Chung Daniel Cheng, New Territories (HK)

(73) Assignee: NANOPETRO COMPANY LIMITED, New Territories (HK)

( * ) Notice: Subject to any disclaimer, the term of this patent is extended or adjusted under 35 U.S.C. 154(b) by 197 days.

(21) Appl. No.: 13/672,298

(22) Filed: Nov. 8, 2012

(65) Prior Publication Data
US 2013/0126394 A1    May 23, 2013

(30) Foreign Application Priority Data

Nov. 8, 2011 (CN) .......................... 2011 1 0351136

(51) Int. Cl.
| | | |
|---|---|---|
| *B01J 20/02* | (2006.01) | |
| *B01J 20/22* | (2006.01) | |
| *B01J 20/28* | (2006.01) | |
| *B01J 20/30* | (2006.01) | |
| *B01J 20/32* | (2006.01) | |
| *B01J 20/34* | (2006.01) | |
| *C10G 25/00* | (2006.01) | |
| *C10G 25/12* | (2006.01) | |
| *C10G 32/02* | (2006.01) | |
| *B01J 20/06* | (2006.01) | |
| *B82Y 30/00* | (2011.01) | |

(52) U.S. Cl.
CPC .............. *B01J 20/3231* (2013.01); *B01J 20/22* (2013.01); *C10G 32/02* (2013.01); *B01J 20/06* (2013.01); *B01J 20/28007* (2013.01); *B01J 20/3204* (2013.01); *B01J 20/3265* (2013.01); *B01J 20/28009* (2013.01); *C10G 2300/104* (2013.01); *C10G 2300/1044* (2013.01); *C10G 2300/1055* (2013.01); *C10G 2300/1062* (2013.01); *C10G 2300/202* (2013.01); *C10G 2400/02* (2013.01); *C10G 2400/04* (2013.01); *C10G 2400/10* (2013.01); *C10G 25/003* (2013.01); *C10G 25/12* (2013.01); *B82Y 30/00* (2013.01)

(58) Field of Classification Search
CPC ...... B01J 20/06; B01J 20/22; B01J 20/28007; B01J 20/28009; B01J 20/3204; B01J 20/3231; B01J 20/3265; C10G 2300/104; C10G 2300/1044; C10G 2300/1055; C10G 2300/1062; C10G 2300/202; C10G 2400/02
See application file for complete search history.

(56) References Cited

U.S. PATENT DOCUMENTS 5,935,608 A    8/1999    Fujikawa et al.

FOREIGN PATENT DOCUMENTS

| CN | 1736881 A | 2/2006 |
|---|---|---|
| WO | WO-0178506 A1 | 10/2001 |

OTHER PUBLICATIONS

Kostmar, C., et al., Stable Citrate-Coated Iron Oxide Superparamagnetic Nanoclusters at High Salinity, Ind. Eng. Chem. Res. 2010, vol. 49, pp. 12435-12443.*

* cited by examiner

*Primary Examiner* — Walter D Griffin
*Assistant Examiner* — Derek Mueller
(74) *Attorney, Agent, or Firm* — Rabin & Berdo, P.C.

(57) ABSTRACT

The present invention provides a method of preparing an iron oxide magnetic nanoparticle, comprising the steps of: i) reacting a water-soluble ferrous salt with a water-soluble ferric salt in a mole ratio of 1:2 in the presence of a base and a citrate to give an iron oxide particle surface-coated with the citrate (c-MNP); ii) reacting the c-MNP obtained in step (i) with a thiophilic compound to give a thiophilic compound-bounded iron oxide particle surface-coated with the citrate (thiophilic-c-MNP); and iii) modifying the thiophilic-c-MNP obtained in step (ii) using a surfactant for phase transfer of the thiophilic-c-MNP from aqueous phase to organic phase. The present invention also relates to the iron oxide magnetic nanoparticle prepared by the above-mentioned method and the use of the nanoparticle in desulfurization. The iron oxide magnetic nanoparticle of the present invention is capable of effective deep desulfurization.

20 Claims, No Drawings

IRON OXIDE MAGNETIC NANOPARTICLE, ITS PREPARATION AND ITS USE IN DESULFURIZATION

TECHNICAL FIELD

The present invention relates to the field of desulfurization technology, more specifically, to a method of preparing an iron oxide magnetic nanoparticle which is used as a desulfurizing adsorbent to effectively achieve deep desulfurization.

BACKGROUND OF THE INVENTION

Pollution in the atmosphere has been an issue to be resolved by the government of every nation. Sulfur-containing compounds (e.g. $SO_x$) in air, in particular, are harmful gases affecting human health. Therefore the governments or international organizations have established emission control legislations and/or measures for sulfur-containing compounds in order to control their emission. The gasoline and diesel oils for industrial applications as well as the gasoline and diesel oils for use as fuels in automobiles contain compounds of sulfur, and combust to generate gases including sulfur dioxide. This is the major polluting source generating sulfur-containing compounds. So the petroleum refining industry generally requires a desulfurization process to reduce sulfur content of the petroleum.

As is well known, gasoline and diesel oils generally contain 300 to 500 ppmw of sulfur-containing compounds, and combust to generate sulfur compounds harmful to automobile engines, human health and the environment. So in recent years more attention is devoted to low-sulfur automobile fuels. One of desulfurization technologies is hydrodesulfurization, which may effectively remove certain sulfur-containing compounds, such as thiols and sulfides. Although the hydrodesulfurization method may lower a part of the sulfur content in gasoline and diesel oils, there are limitations in this method, for example it is unable to remove thiophenic compounds such as alkyl dibenzothiophenes (DBTs) bearing one or more alkyl groups at 4- and/or 6-position(s). Thus it is not possible for deep desulfurization. Besides, the hydrodesulfurization method requires to be carried out at a high temperature such as 320-380° C. and a high pressure such as 3-7 Mpa. Hence a great amount of energy needs to be consumed. Also, equipments capable of withstanding the high temperature and the high pressure need to be made, so the cost of equipment is high.

Another desulfurization technology is the use of desulfurizing adsorbents, such as reduced metals, metal oxides, metal loaded zeolite-based materials, activated alumina, carbonaceous materials, and the like. However, low sulfur adsorption capacity of these adsorbents is their major defect because of low pore volume and low surface area to volume ratio. This defect has limited their applications.

Nanotechnology has in recent years found applications in many areas. Since nanomaterials possess surface effect, volume effect and quantum size effect, they exhibit many surprising physical and chemical properties. Of these materials, magnetic nanoparticles (MNPs) may form a core-shell structured composite microsphere together with organic compounds, polymers or inorganic materials by surface copolymerization and surface modification, wherein the core is magnetic, and the shell possesses surface-active functional groups able to couple with various organic and inorganic species. Under the action of an externally-applied magnetic field, the magnetic nanoparticles may be conveniently separated from the base solution. The separation is simple, costs little and has high separation efficiency. Moreover, the magnetic microspheres possess a large specific surface area, so they have the advantages including high adsorption capacity, fast adsorption rate, and the like. They show very good prospects for applications in the separation, adsorption and purification of substances.

Chinese patent application No. 200510019060.9 discloses a $Fe_3O_4$/Au core-shell structured magnetic nanogranule and a method of its preparation. The method comprises adding a mixture of aqueous ammonia and sodium citrate to a mixed solution of $FeCl_2$ and $FeCl_3$, controlling the growth of an iron oxide nanogranule, then adding sodium citrate solution and $HAuCl_4$ solution, and growing on the $Fe_3O_4$ nanogranule a Au shell layer to form a $Fe_3O_4$/Au core-shell structured magnetic nanogranule. The nanogranule may be used in biology and medicine.

International patent application No. WO 01/78506A1 discloses an oxide nanoadsorbent and a method of its preparation. The oxide nanoadsorbent may destroy biological reagents such as toxins. The oxide may be MgO, CaO, $TiO_2$, $ZrO_2$, FeO, $Fe_2O_3$, NiO, CuO, $Al_2O_3$, ZnO, $Mn_2O_3$, $V_2O_3$, $V_2O_5$ and mixtures thereof. The particle surface of the oxide nanoadsorbent disclosed in this application may be modified by a metal oxide different from itself.

Presently, in order to reduce damages to the industrial production and the environment by sulfur-containing compounds and safeguard human health, researchers have conducted substantial research work on the desulfurization of substances containing sulfur-containing compounds. In particular, extensive attempts have been made to the deep desulfurization (removing thiophenic compounds) of gasoline and diesel oils for use as fuels in automobiles. There are now some compound adsorbents for thiophenic compounds being tried for deep desulfurization, but their small specific surface area limits their loading capacity. So their desulfurizing ability is not high.

People are becoming more concerned with the design and manufacture of magnetic nanoparticles which find a wide range of applications in many areas such as magnetic separation, magnetic probing, biomedicine. However, application of magnetic nanoparticles in deep desulfurization has not been known yet.

SUMMARY OF THE INVENTION

An object of the present invention is to provide a method of preparing an iron oxide magnetic nanoparticle. The nanoparticle obtained by the method may selectively remove sulfur-containing compounds such as thiophenic compounds.

Another object of the present invention is to provide an iron oxide magnetic nanoparticle, which may effectively remove sulfur-containing compounds such as thiophenic compounds conveniently at low costs with low energy consumption.

In order to achieve the above objects, a first aspect of the present invention provides a method of preparing an iron oxide magnetic nanoparticle, comprising the steps of:

i) reacting a water-soluble ferrous salt with a water-soluble ferric salt in a mole ratio of 1:2 in the presence of a base and a citrate to give an iron oxide particle surface-coated with the citrate (c-MNP), a $Fe_2O_3$ particle for example;

ii) reacting the c-MNP obtained in step (i) with a thiophilic compound to give a thiophilic compound-bounded iron oxide particle surface-coated with the citrate (thiophilic-c-MNP); and iii) modifying the thiophilic-c-MNP obtained in step (ii) using a surfactant for phase transfer of the thiophilic-c-MNP from aqueous phase to organic phase.

According to one preferred Example of the present invention, the water-soluble ferrous salt is ferrous chloride, the water-soluble ferric salt is ferric chloride and the citrate is sodium citrate. Preferably, the ferrous chloride has a concentration ranging from 0.04 M to 1.00 M, the ferric chloride has a concentration ranging from 0.08 M to 2.00 M and the sodium citrate has a concentration ranging from 0.20 M to 1.00 M.

According to another preferred Example of the present invention, the thiophilic compound is a cuprous salt, such as cuprous chloride. Preferably, the cuprous chloride has a concentration ranging from $6\times10^{-3}$ M to 0.25 M.

Preferably, cetyltrimethylammonium bromide (CTAB) is used as the surfactant to produce a CTAB-modified thiophilic-c-MNP (CTAB-thiophilic-c-MNP). The CTAB has a concentration ranging from 0.08 M to 0.200 M.

By controlling the use of the types and concentrations of iron salts, the iron oxide magnetic nanoparticle obtained by the present invention has an average particle diameter of 1-1.4 μm.

A second aspect of the present invention relates to an iron oxide magnetic nanoparticle prepared according to the method described in the first aspect of the present invention.

A third aspect of the present invention provides a method of removing a sulfur-containing compound from a substance. The method comprises exposing the substance to the iron oxide magnetic nanoparticle prepared according to the method of the present invention under conditions suitable for absorption of at least a part of the sulfur-containing compound, especially a thiophenic compound.

The removal method of the invention may further comprise the steps of: separating the iron oxide magnetic nanoparticle with the sulfur adsorbed from the substance by applying a gradient magnetic field; treating the separated iron oxide magnetic nanoparticle with an acidic solution to regenerate the nanoparticle, wherein the acidic solution has a pH of from 1 to 6; then applying a magnetic field to the regenerated iron oxide magnetic nanoparticle for separation and a subsequent water washing of the nanoparticle, thus recovering the recyclable iron oxide magnetic nanoparticle.

According to one example of the present invention, the iron oxide magnetic nanoparticle is used in an amount of 5 to 10 g per liter of the substance containing sulfur-containing compounds. In general, the iron oxide magnetic nanoparticle and the substance are stirred at 100 rpm for about 15-25 minutes at 40-60° C., then the sulfur-containing compounds may be adsorbed onto the iron oxide magnetic nanoparticle.

The substance containing sulfur-containing compounds may be gasoline, diesel oil, lubricating oil or other fuel oils. The thiophenic compounds include thiophene, benzothiophene, dibenzothiophene, 4,6-dimethyldibenzothiophene and thiophenic compounds bearing one or two alkyl groups at 4- and/or 6-position(s).

Unlike the prior art technologies, for instance, fixed-bed desulfurization which employs thiophilic adsorbents such as reduced metals, metal oxides, metal loaded zeolite-based materials, activated alumina, and carbonaceous materials, the present invention makes use of a magnetic nanoparticle as a sulfur adsorbent. This is because such a magnetic nanoparticle has high specific surface area and strong adsorption capacity, to which any other thiophilic adsorbents are not comparable. The present invention is characterized in the combination of high specific surface area of the nanoparticle, thiophilic element like copper towards which sulfur is highly adsorbed, and the attribute of hexadecyltrimethylammonium salt (CTAB) enabling the nanoparticles to easily disperse in an organic phase, this combination allows for effective deep desulfurization. It has already been discovered that the iron oxide magnetic nanoparticle of the present invention can remove thiophenic compounds at a concentration of ppmw level to provide an extremely high desulfurizing efficiency.

Furthermore, the feature that the magnetic nanoparticle is easily separable under an applied magnetic field allows the nanoparticle with sulfur adsorbed to be regenerated and recycled.

DETAILED DESCRIPTION OF THE INVENTION

The fuel oil will be taken as an example to illustrate the concept, the specific structure and the technical effect of the present invention in details in order for a thorough understanding of the objects, features and effects of the invention hereinbelow.

As is well known, fuel oils contain sulfur-containing compounds and combust to generate sulfur-containing gases or sulfides which not only harm automobile engines, but also have an adverse impact on human health and the environment. Therefore, in order to reduce the emission of sulfur-containing gases or sulfides, the most effective method is to provide low-sulfur fuel oils or even sulfur free fuel oils, such that the gases generated upon combustion of the fuel oils can satisfy the relevant emission control legislations without the need of desulfurization treatment.

Many efforts have been made in this regard, but effective removal of sulfur-containing compounds at a ppm concentration from the fuel oils remains unsettled. The present invention proposes the use of the iron oxide magnetic nanoparticle to remove thiophenic compounds from the fuel oils, thus achieving deep desulfurization of the fuel oils.

In one preferred example of the present invention, $FeCl_2$ and $FeCl_3$ are used as the starting materials to prepare a $\gamma\text{-}Fe_2O_3$ magnetic nanoparticle which is then surface-coated with citrate to form a $Fe_2O_3$-citrate core-shell particle (c-$Fe_2O_3$) according to the following chemical equations:

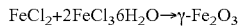

$$FeCl_2 + 2FeCl_3 6H_2O \rightarrow \gamma\text{-}Fe_2O_3$$

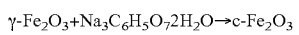

$$\gamma\text{-}Fe_2O_3 + Na_3C_6H_5O_7 2H_2O \rightarrow c\text{-}Fe_2O_3$$

The obtained ferric oxide magnetic nanoparticle surface-coated with the citrate is represented by c-MNP. The c-MNP is the core of the desulfurizing adsorbent of the present invention and can be conveniently separated from the fuel oils under the action of an externally-applied magnetic field, because of the presence of iron ions. This provides the advantages of operational simplicity and high separation efficiency.

By adjusting the concentrations and types of iron salts, the size of the nanoparticles may be controlled in the desired order of magnitude, such as 1 to 1.4 μm, i.e. 1 000 to 1 400 nm.

The c-MNP is then bound to a thiophilic element such as copper. In particular, cuprous chloride reacts with the c-MNP to permit the binding of copper to the c-MNP, forming copper-bounded c-MNP (Cu-c-MNP):

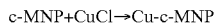

$$c\text{-}MNP + CuCl \rightarrow Cu\text{-}c\text{-}MNP$$

As copper is highly adsorptive to sulfur, and also due to the very high specific surface area of the nanoparticle, the copper-bounded nanoparticle, Cu-c-MNP, can efficiently adsorb sulfur, in particular thiophenic compounds, resulting in deep desulfurization.

The Cu-c-MNP is hydrophilic and difficult to interact with organic compounds. In order that the Cu-c-MNPs highly disperses in an organic phase and interact with the organic phase, it is required to modify the Cu-c-MNP by, for example, phase transfer of the Cu-c-MNP from the aqueous phase to the organic phase so that the Cu-c-MNP can function in the fuel oil/organic phase. For example, the surfactant cetyltrimethylammonium bromide (CTAB) may be used to surface-modify the Cu-c-MNP to obtain a CTAB-modified Cu-c-MNP (CTAB-Cu-c-MNP):

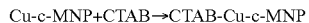

The surface attribute of CTAB makes the magnetic nanoparticle to easily disperse in the organic phase for better adsorption of sulfur-containing substances in the fuel oils. It has been found that the CTAB-Cu-c-MNP of the present invention is highly adsorptive to sulfur and was confirmed to adsorb 8-40 mg of sulfur/g CTAB-Cu-c-MNP nanoparticle. Thus, the the CTAB-Cu-c-MNP of the present invention has an adsorption capacity much higher than currently available desulfurizing agents (0-20 mg sulfur/g desulfurizing agent).

EXAMPLE 1

Preparation of Iron Oxide Magnetic Nanoparticle Surface-Coated with Citrate (c-MNP)

20 mL of a 0.04 M ferrous chloride ($FeCl_2$) solution and 20 mL of a 0.08 M of ferric chloride ($FeCl_3$) solution were prepared separately. The two solutions were stirred at a high rate for 20 minutes, respectively. After stirring, the two solutions were added into 400 mL of a 0.60 M aqueous ammonia ($NH_4OH$), and the mixture was stirred at room temperature for about 60 minutes, and then stirred under reflux for about 60 minutes. The mixture is allowed to cool down to room temperature, and then is centrifuged (6000 rpm) for about 20 minutes) to remove the upper layer of residual unreacted impurity. 400 mL of water was added to wash the precipitate. The centrifugation was repeated three times to obtain 400 mL of a purified iron oxide magnetic nanoparticle (MNP) as a solid.

250 mL of a 4.0 M nitric acid solution was added to the MNP, the suspension was stirred at a normal rate for 20 minutes. The MNP was extracted by centrifugation (6000 rpm, about 20 minutes). The MNP was added to 400 mL of water and heated under reflux. During the reflux, 100 mL of a 1.0 M sodium citrate was added and the mixture was heated under reflux for another one hour. The mixture was allowed to cool down at room temperature and then undergoes ultrafiltration to remove the residual unreacted sodium citrate from the reaction mixture, until the filtrate has the same electrical conductivity as water. A purified iron oxide magnetic nanoparticle surface-coated with citrate (c-MNP) was obtained.

EXAMPLE 2

Preparation of Copper-Bounded c-MNP (Cu-c-MNP)

144 mL of a 0.233 M cuprous chloride (CuCl) solution was prepared. To this solution, a proper amount of the c-MNP prepared in Example 1 with the concentration of the c-MNP adjusted to 0.4% was added. The mixture was stirred for 10 minutes at room temperature at 200 rpm and under nitrogen atmosphere. A magnet is placed under the bottom of the reaction flask for 15 minutes to allow for attraction of the Cu-c-MNP onto the bottom of the reaction flask. The upper layer of liquid is removed. 144 mL of a 0.1 M hydrochloric acid solution is added into the solution, the mixture was stirred at a normal rate for 20 minutes. The above magnetization and separation process was repeated 3 times.

Similarly, water may be used instead of hydrochloric acid to remove the hydrochloric acid in the mixture by the magnetization and separation process. The Cu-c-MNPs obtained dispersed effectively in water.

EXAMPLE 3

Preparation of CTAB-Modified Cu-c-MNP (CTAB-Cu-c-MNP)

1.74 g of the hexadecyltrimethylammonium salt (CTAB) was added to 40 mL of the solvent trichloromethane (chloroform) to prepare a 0.119 M solution of the hexadecyltrimethylammonium salt. Then 20 mL of a 0.8 wt % aqueous solution of the Cu-c-MNP (prepared in Example 2) was added, and the mixture was stirred at a normal rate for 20 minutes. The mixture was then placed in a separating funnel and the lower layer of trichloromethane organic phase was collected. To the trichloromethane organic phase, an excessive amount of anhydrous sodium sulfate was added. The mixture was allowed to stand at room temperature for 24 hours to absorb the water contained in the organic phase.

A high gradient magnetic separation column was used to remove the residual unreacted hexadecyltrimethylammonium salt in the trichloromethane organic phase. Then the trichloromethane organic phase was placed in a rotary evaporator to extract the CTAB-modified Cu-c-MNP (CTAB-Cu-c-MNP) as a powder.

To remove the thiophenic compounds in a fuel oil, the fuel oil and the CTAB-Cu-c-MNP nanoparticles of the present invention are mixed in a ratio of 1 liter to 5-10 g. For example, the fuel oil and the CTAB-Cu-c-MNPs may be mixed in a batch reactor and the mixture is stirred at 100 rpm for about 15-25 minutes at 40-60° C. (preferably 50° C.). After the stirring completes, the sulfur-containing compounds including thiophenic compounds present in the fuel oil all are adsorbed onto the CTAB-Cu-c-MNP nanoparticles. As mentioned above, since the CTAB-Cu-c-MNPs contain the highly thiophilic copper and have a high specific surface area, the thiophenic compounds are absorbed efficiently, with very good deep desulfurization results. Besides, the surface attribute of CTAB present in the CTAB-Cu-c-MNP enables good dispersion of the nanoparticles in the organic phase, which further enhances the adsorption of thiophenic compounds.

Because the CTAB-Cu-c-MNP nanoparticles contain irons in the core thereof, application of a high gradient magnetic field such as a high gradient magnetic separation column to the nanoparticles with sulfur-containing compounds adsorbed permits their separation from each other. The separated CTAB-Cu-c-MNP and the desulfurized fuel oil are then collected respectively. As the vast majority of the sulfur-containing compounds have been adsorbed onto the CTAB-Cu-c-MNP nanoparticles, an extremely little amount of the sulfur-containing compounds will be generated when the desulfurized fuel oil combusts, which will have no impact on the environment and human health.

The CTAB-Cu-c-MNP nanoparticles separated by the magnetic field may be treated with an acid solution (such as a hydrochloric acid solution or a sulfuric acid solution) at pH 1-6. For example, the CTAB-Cu-c-MNP nanoparticles are stirred at 100 rpm for a proper time period to allow the sulfur-containing compounds attached onto the CTAB-Cu-c-MNP nanoparticles to react completely with the acid for removal of the sulfur-containing compounds, so as to regenerate the CTAB-Cu-c-MNP nanoparticles. The regenerated CTAB-Cu-c-MNP nanoparticles may be separated under the action of an externally-applied magnetic field and then washed with water multiple times. The washed CTAB-Cu-c-MNP nanoparticles may be recycled. This will further lower the cost of desulfurization.

The invention thus provides a method of preparing an iron oxide magnetic nanoparticle and its use in removing sulfur-containing compounds from a fuel oil. It should be understood that the iron oxide magnetic nanoparticle according to the present invention may be applied to other areas requiring desulfurization, such as desulfurization in an industrial production. According to the invention, the method of preparing the nanoparticle and the use of the nanoparticle in desulfurization are simple and convenient to operate at low cost, especially suitable for a large-scale industrialized production.

While the embodiments described herein are intended as exemplary preparation and desulfurization methods of the iron oxide magnetic nanoparticle, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed:

1. A method of preparing an iron oxide magnetic nanoparticle, comprising the steps of:
   i) reacting a water-soluble ferrous salt with a water-soluble ferric salt in a mole ratio of 1:2 in the presence of a base and a citrate to give an iron oxide particle surface-coated with the citrate (c-MNP);
   ii) reacting the c-MNP obtained in step (i) with a thiophilic compound to give a thiophilic compound-bounded iron oxide particle surface-coated with the citrate (thiophilic-c-MNP); and
   iii) modifying the thiophilic-c-MNP obtained in step (ii) using a surfactant for phase transfer of the thiophilic-c-MNP from aqueous phase to organic phase.

2. The method according to claim 1, wherein the water-soluble ferrous salt is ferrous chloride, the water-soluble ferric salt is ferric chloride, and the citrate is sodium citrate.

3. The method according to claim 2, wherein the ferrous chloride has a concentration ranging from 0.04 M to 1.00 M, the ferric chloride has a concentration ranging from 0.08 M to 2.00 M, and the sodium citrate has a concentration ranging from 0.20 M to 1.00 M.

4. The method according to claim 1, wherein the thiophilic compound is a cuprous salt.

5. The method according to claim 4, wherein the cuprous salt is cuprous chloride.

6. The method according to claim 5, wherein the cuprous chloride has a concentration ranging from $6 \times 10^{-3}$ M to 0.25 M.

7. The method according to claim 1, wherein cetyltrimethylammonium bromide (CTAB) is used as the surfactant to produce a CTAB-modified thiophilic compound-bounded iron oxide particle surface-coated with the citrate (CTAB-thiophilic-c-MNP).

8. The method according to claim 7, wherein the CTAB has a concentration ranging from 0.08 M to 0.200 M.

9. The method according to claim 1, wherein the iron oxide magnetic nanoparticle has an average particle size of 1-1.4 µm.

10. An iron oxide magnetic nanoparticle prepared by a method according to claim 1.

11. A method of removing a sulfur-containing compound from a substance containing the sulfur-containing compound, comprising exposing the substance to the iron oxide magnetic nanoparticle prepared by a method according to claim 1 under conditions suitable for absorption of at least a part of the sulfur-containing compound.

12. The method according to claim 11, wherein the sulfur-containing compound is thiophenic compounds.

13. The method according to claim 12, wherein the thiophenic compounds include thiophene, benzothiophene, dibenzothiophene, 4,6-dimethyldibenzothiophene and thiophenic compounds bearing one or two alkyl groups at 4- and/or 6-positions.

14. The method according to claim 11, further comprising separating the iron oxide magnetic nanoparticle with the sulfur adsorbed from the substance by applying a gradient magnetic field.

15. The method according to claim 14, further comprising treating the separated iron oxide magnetic nanoparticle with an acidic solution to regenerate the nanoparticle.

16. The method according to claim 15, wherein the acidic solution is at a pH of from 1 to 6.

17. The method according to claim 15, further comprising applying a magnetic field to the regenerated iron oxide magnetic nanoparticle for separation and a subsequent water washing of the nanoparticle in order to recover the iron oxide magnetic nanoparticle.

18. The method according to claim 11, wherein the iron oxide magnetic nanoparticle is used in an amount of 5 to 10 g per liter of the substance.

19. The method according to claim 11, wherein the iron oxide magnetic nanoparticle and the substance are stirred at 100 rpm for about 15-25 minutes at 40-60° C.

20. The method according to claim 11, wherein the substance is selected from the group consisting of gasoline, diesel oil, lubricating oil or other fuel oils.

* * * * *